United States Patent [19]
Urbanczyk

[11] Patent Number: 5,937,963
[45] Date of Patent: Aug. 17, 1999

[54] PIVOTABLE WHEEL MOUNTING SYSTEM AND METHOD THEREOF

[75] Inventor: Marvin L. Urbanczyk, White Deer, Tex.

[73] Assignee: Scarab Manufacturing and Leasing, Inc., White Deer, Tex.

[21] Appl. No.: 08/871,946

[22] Filed: Jun. 10, 1997

[51] Int. Cl.⁶ ................................................. B62D 61/00
[52] U.S. Cl. .................... 180/208; 280/43; 280/43.17
[58] Field of Search .............................. 180/208; 280/43, 280/43.17, 43.13, 43.23; 172/400, 407, 421, 413

[56] References Cited

U.S. PATENT DOCUMENTS

| | | |
|---|---|---|
| 1,942,022 | 1/1934 | Faries . |
| 2,304,622 | 12/1942 | Barrett . |
| 2,762,631 | 9/1956 | Entz . |
| 2,853,308 | 9/1958 | Schramm . |
| 3,417,832 | 12/1968 | Ziccardi . |
| 3,427,078 | 2/1969 | Parsons . |
| 3,664,448 | 5/1972 | Hudis . |
| 3,677,427 | 7/1972 | Allen . |
| 3,904,216 | 9/1975 | McTrailer ................................. 280/43 |
| 4,060,145 | 11/1977 | Kingman et al. ..................... 280/43.17 |
| 4,132,323 | 1/1979 | Simmons . |
| 4,139,065 | 2/1979 | Lewison . |
| 4,850,786 | 7/1989 | Oswald et al. ....................... 180/208 X |
| 4,977,971 | 12/1990 | Crane, III et al. . |
| 5,050,897 | 9/1991 | Stromberg ................................ 280/43 |
| 5,097,922 | 3/1992 | Stagi ...................................... 180/208 |

FOREIGN PATENT DOCUMENTS

| | | | |
|---|---|---|---|
| 737746 | 7/1966 | Canada ................................. 180/208 |
| 206469 | 12/1983 | Japan ..................................... 180/208 |

*Primary Examiner*—Christopher P. Ellis
*Attorney, Agent, or Firm*—Birch, Stewart, Kolasch & Birch, LLP

[57] ABSTRACT

A pivotable wheel mounting system can pivot wheel mounting devices of a vehicle in a retracted position so that the vehicle conforms to a vehicle carrier volume that is in accordance with local transport laws and regulations. The pivotable wheel mounting system extends the wheels of a vehicle to positions for substantially stable support in a driving (non-transport) mode. The pivotable wheel mounting system reduces the vehicle frame volume when the vehicle is in a transport mode. The pivotable wheel system is preferably for compost treating vehicles with endless track units.

24 Claims, 9 Drawing Sheets

PIVOTABLE WHEEL MOUNTING SYSTEM AND METHOD THEREOF

BACKGROUND OF THE INVENTION

1. Field of the Invention

The present invention generally relates to a pivotable wheel mounting system and a method for loading and unloading a compost vehicle and to a vehicle carrier for the compost vehicle. This system has a wheel pivoting device which has extended and retracted positions.

2. Description of the Background

Various wheel pivoting devices are known in the art. These wheel pivoting devices provide mechanisms which can adjust the position of wheels of a vehicle for transport. However, these wheel pivoting devices are not designed to conform the wheels of a vehicle to the volume of a carrier which volume is regulated by local transportation laws and regulations. Frequently, the wheel mounting devices and/or wheels of prior art agricultural vehicles, for example, extend beyond the vehicle carrier volume and thus, constitute a "wide" load. Overextending wheel mounting devices and/or wheels are especially found in wheel mounting devices which support compost treating vehicles.

Accordingly, a need in the art exists for a pivotable wheel mounting system which can pivot wheel mounting devices of a vehicle to a retracted position so that the vehicle conforms to a vehicle carrier volume that is in accordance with local transport laws and regulations. The pivotable wheel mounting system extends the wheels of a vehicle to positions for substantially stable support in a driving (non-transport) mode. Furthermore, a need exists in the art to provide a dynamic wheel carrier assembly which permits the pivotable wheel mounting system to further reduce the vehicle frame volume when the vehicle is in a transport mode.

SUMMARY OF THE INVENTION

Accordingly, it is a primary object of the present invention to provide a pivotable wheel mounting system for a vehicle which supports a wheel whereby when the wheel mounting device is in a retracted position, the vehicle frame of the vehicles substantially encloses the wheel for compact storage and when the wheel mounting device is in the extended position, the wheel provides substantially stable support for the vehicle in a driving (non-transport) mode.

It is additionally a further object of the present invention to provide a method for loading and unloading a vehicle onto a vehicle carrier whereby the vehicle is stably secured on the vehicle carrier.

Another object of the present invention is to provide compact storage of the wheels of a vehicle especially for wheels which are enclosed by endless track units.

It is a further object of the present invention to provide a pivotable wheel mounting system wherein each of the pivotable wheels may be pivoted for compact storage and where each wheel has its own power device to provide a four wheel drive type vehicle.

It is additionally a further object of the present invention to provide a vehicle carrier which minimizes the volume occupied by the vehicle in a transport mode.

Yet another object of the invention is to provide a vehicle carrier which can readily accommodate a vehicle with a pivotable wheel mounting system.

These and other objects of the present invention are fulfilled by providing a pivotable wheel mounting system for a vehicle comprising a wheel; a wheel mounting device for supporting the wheel; means for pivoting the wheel mounting device in an extended position and a retracted position; and a vehicle frame with an adjustable suspension structure for pivotally supporting the wheel mounting device, the adjustable suspension structure raises and lowers the wheel mounting device and the wheel, said means for pivoting the wheel mounting device being connected to the adjustable suspension structure, whereby when the wheel mounting device is in the extended position, the wheel is in a use position whereby the vehicle is drivable, and when the wheel mounting device is in the retracted position, the adjustable suspension structure substantially encloses the wheel for compact storage.

In addition, these and other objects of the present invention are also accomplished by a method of loading and unloading a vehicle onto a vehicle carrier the method comprising the steps of providing a vehicle with a frame and a wheel mounting device, the wheel mounting device rotatably supporting at least one wheel; moving the vehicle onto the vehicle carrier; lowering the frame onto the carrier by an adjustable suspension structure; and pivoting the wheel mounting device after the step of lowering to substantially enclose the at least one wheel within the adjustable suspension structure for compact storage.

Additionally, these and other objects of the present invention are fulfilled by a vehicle carrier comprising a substantially planar vehicle frame platform; a plurality of wheels; and a plurality of vehicle wheel wells, each well having a support platform spaced from the vehicle frame platform and being in a different plane.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE
PREFERRED EMBODIMENTS

Figure 1:
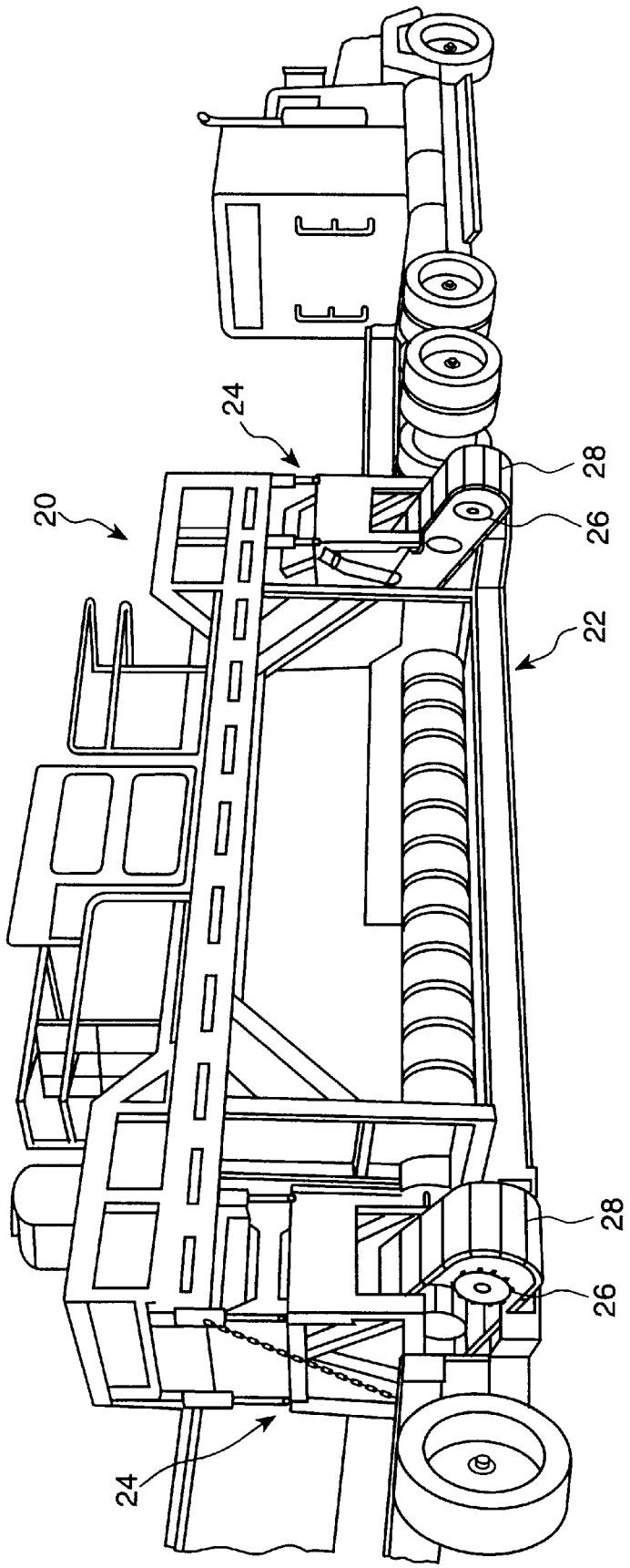
FIG. 1 shows an isometric view of a first embodiment of the pivotable wheel mounting system for a compost vehicle loaded on a vehicle carrier prior to the pivoting of the endless track units.

Referring in detail to the drawings and with particular reference to FIG. 1, the compost treating vehicle 20 is shown loaded on a vehicle carrier 22. The pivotable wheel mounting system 24 is shown in an extended position where the wheels 26 of the endless tracks 28 are in a use position whereby the vehicle 20 is drivable. The pivotable wheel mounting system 24 is not limited to compost treating vehicles 20. The pivotable wheel mounting system 24 can be used in other machines such as asphalt compacting machines having rotating drums, large movable conveyers having rotating rollers, or any type of agricultural equipment which can be placed on a vehicle carrier. Other applications include military type equipment which frequently employ endless tracks 28 for vehicle movement over rough terrains. The pivotable wheel mounting system 24 enables large vehicles such as compost treating vehicles 20 to conform to a carrier volume of a vehicle carrier 22 so that the compost treating vehicle 20 and the vehicle carrier 22 do not constitute a "wide" load and are in conformance with local transportation laws and regulations governing the space requirements of a trailer/carrier load.

Figure 2:
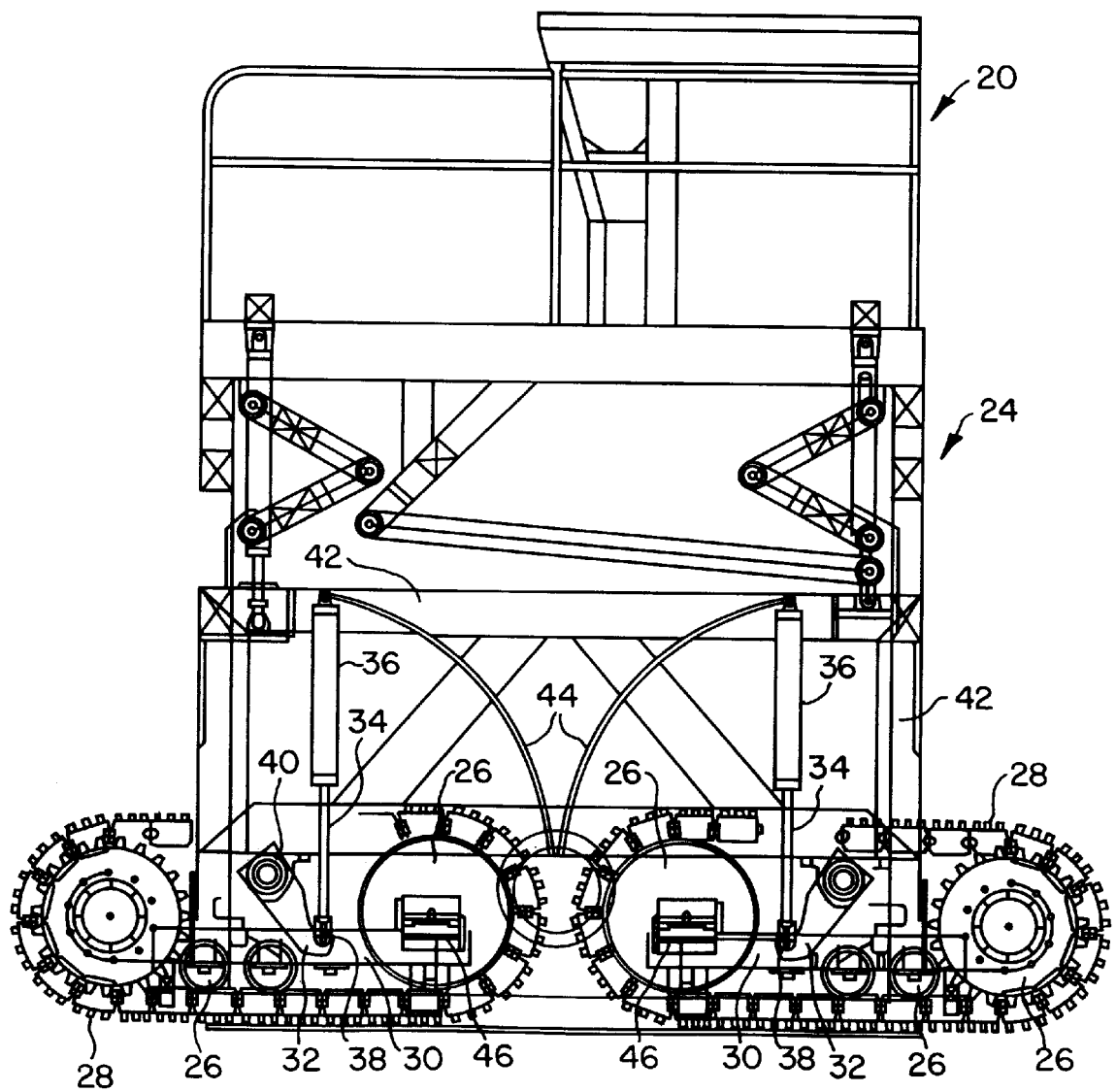
FIG. 2 shows a side view of the pivotable wheel mounting system of the compost vehicle of the first embodiment with the wheel mounting device in an extended position.

In FIG. 2, a pivotable wheel mounting system 24 of a first embodiment of the present invention is shown. The wheels 26 of endless tracks 28 are mounted to a beam structure 30. The beam structure 30 is preferably used to support the wheels 26 but other structures such as complex frame assemblies or axle assemblies or the like may be employed. The beam structure 30 is connected to both an arm structure 32 and a piston 34 of a cylinder 36. The connection between the beam structure 30, the arm structure 32, and the piston 34 preferably includes a pin joint assembly which permits rotation of the arm 32 and beam structure 30 relative to the piston 34. The connection between the beam structure 30, the arm structure 32 and the piston 34 is not limited to a pin assembly and therefore other structures such as bearings or the like may be employed. The arm structure 32 is connected to an adjustable suspension structure 42 by a second pin assembly 40. Similar to the pin assembly 38, the pin assembly 40 may employ other structures such as bearings or the like to permit rotational movement of the arm 32. The arm structure 32 preferably has an arc shape to provide mechanical advantage in the rotation of the arm structure 32. The arm structure 32 is not limited to the shape shown in the drawings and can include a straight arm structure or arm structures with angled sections or the like. The adjustable suspension structure can include the suspension structure of U.S. Pat. No. 5,390,752 to the present inventor, Marvin Urbanczyk, which is hereby incorporated by reference for the purposes of illustrating the state of the art, but other suspension structures which provide elevational movement of vehicle wheels may be employed.

The cylinder 36 which supports the piston 34 is preferably mounted to the adjustable suspension structure 42 by bolts but other attachment devices such as rivets used with flanges or welds or the like can be employed. The piston 34 and cylinder 36 provide means for pivoting the beam structure 30 and the arm structure 32 which constitutes a wheel mounting device. The cylinder 36 is preferably a hydraulic cylinder arrangement, but other cylinder arrangements such as pneumatic cylinders or extending devices such as rotating screws or the like may be employed.

Figure 3:
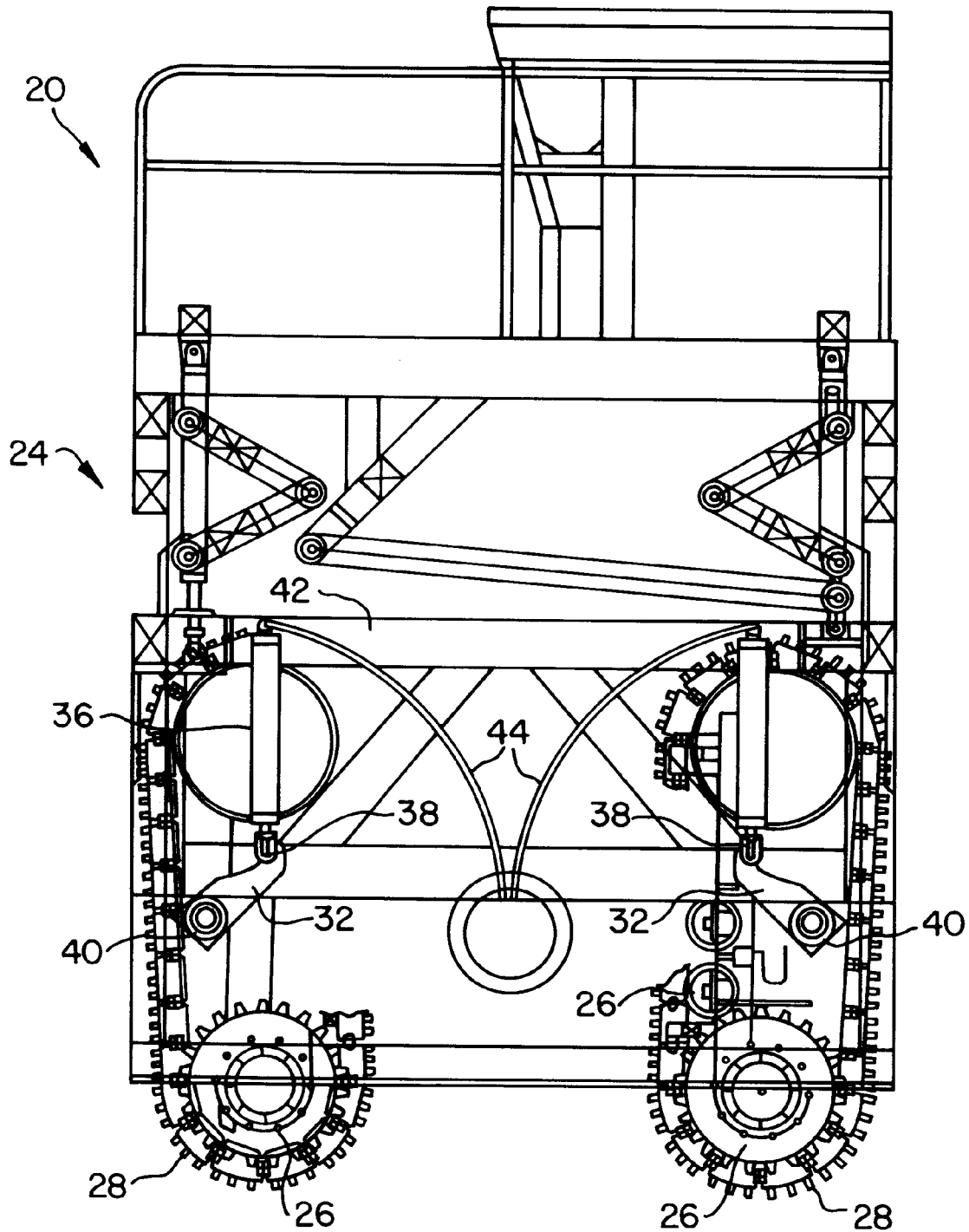
FIG. 3 shows a side view of the pivotable wheel mounting system of the first embodiment with the wheel mounting device in a retracted position.

From the extended position of the beam structure 30 and arm structure 32 shown in FIG. 2 to the retracted position of the beam structure 30 and arm structure 32 shown in FIG. 3, the cylinder 36 and piston 34 rotate the wheels 26 by substantially 90 degrees. In the retracted position, the beam structure is substantially parallel to the cylinder 36 and piston 34. The endless tracks 28 and the wheels 26 are substantially enclosed by the adjustable suspension structure 42 which includes fenders 44 for compact storage of the wheels 26 as shown in FIG. 3. It is noted that at least one wheel 26 of each endless track 28 includes a power device 46 for driving each endless track 28. The powering device preferably includes a hydraulic motor but other motors such as electrical motors or internal combustion motors or the like may be employed. Since each track 28 has a separate power device 46 and four endless tracks 28 are preferably employed with the compost treating vehicle 20, the compost treating vehicle 20 will have the additional benefit of four wheel drive to permit driving of the vehicle 20 over rough terrains such as fields lined with compost windrows. It is noted that in the extended position, the wheel mounting device (the beam structure 30) is substantially perpendicular to the piston 34 and cylinder 36 of the means for pivoting the wheel mounting device.

Figure 4:
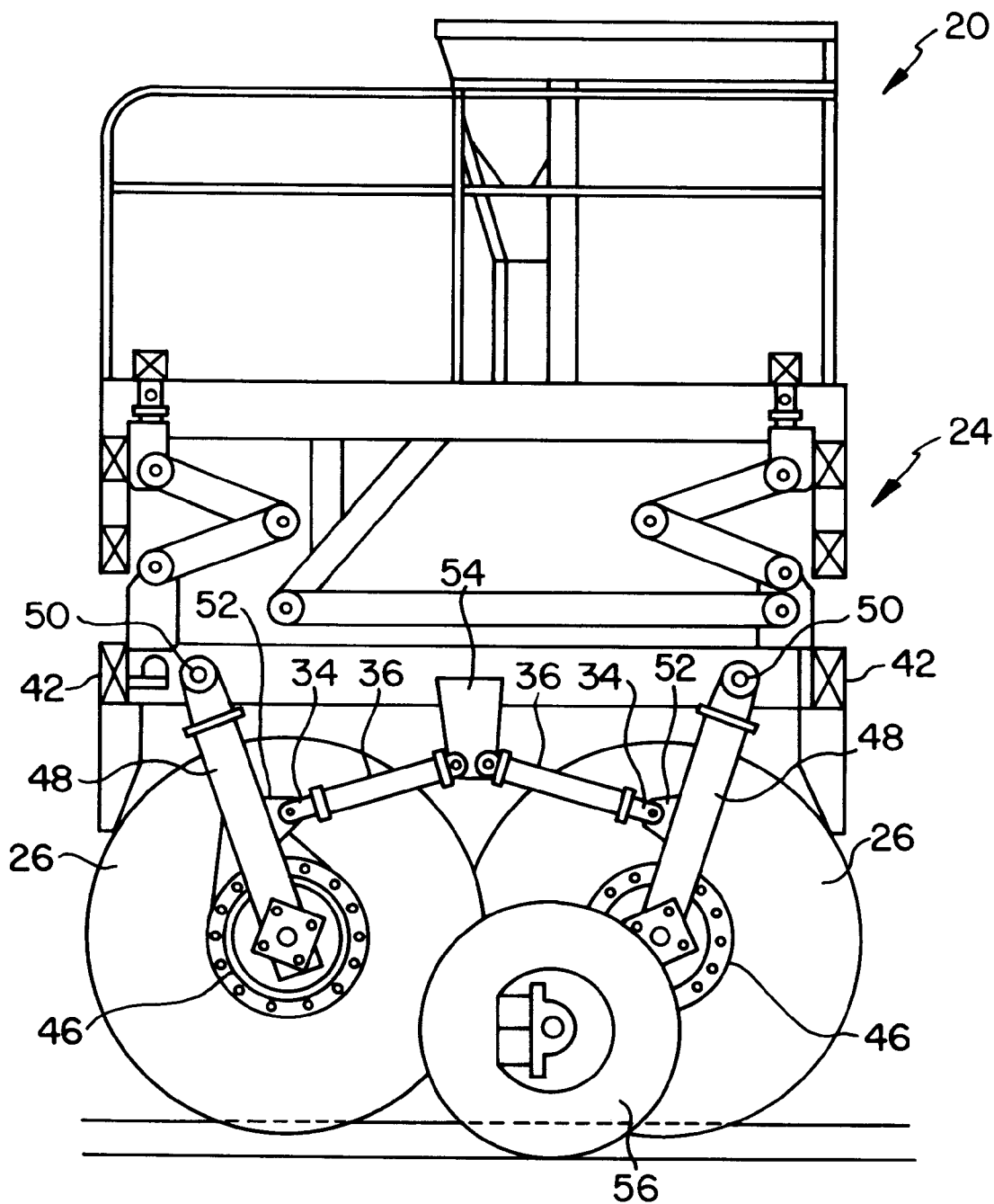
FIG. 4 shows a side view of the pivotable wheel mounting system of the second embodiment with the wheel mounting device in a retracted position.
Figure 5:
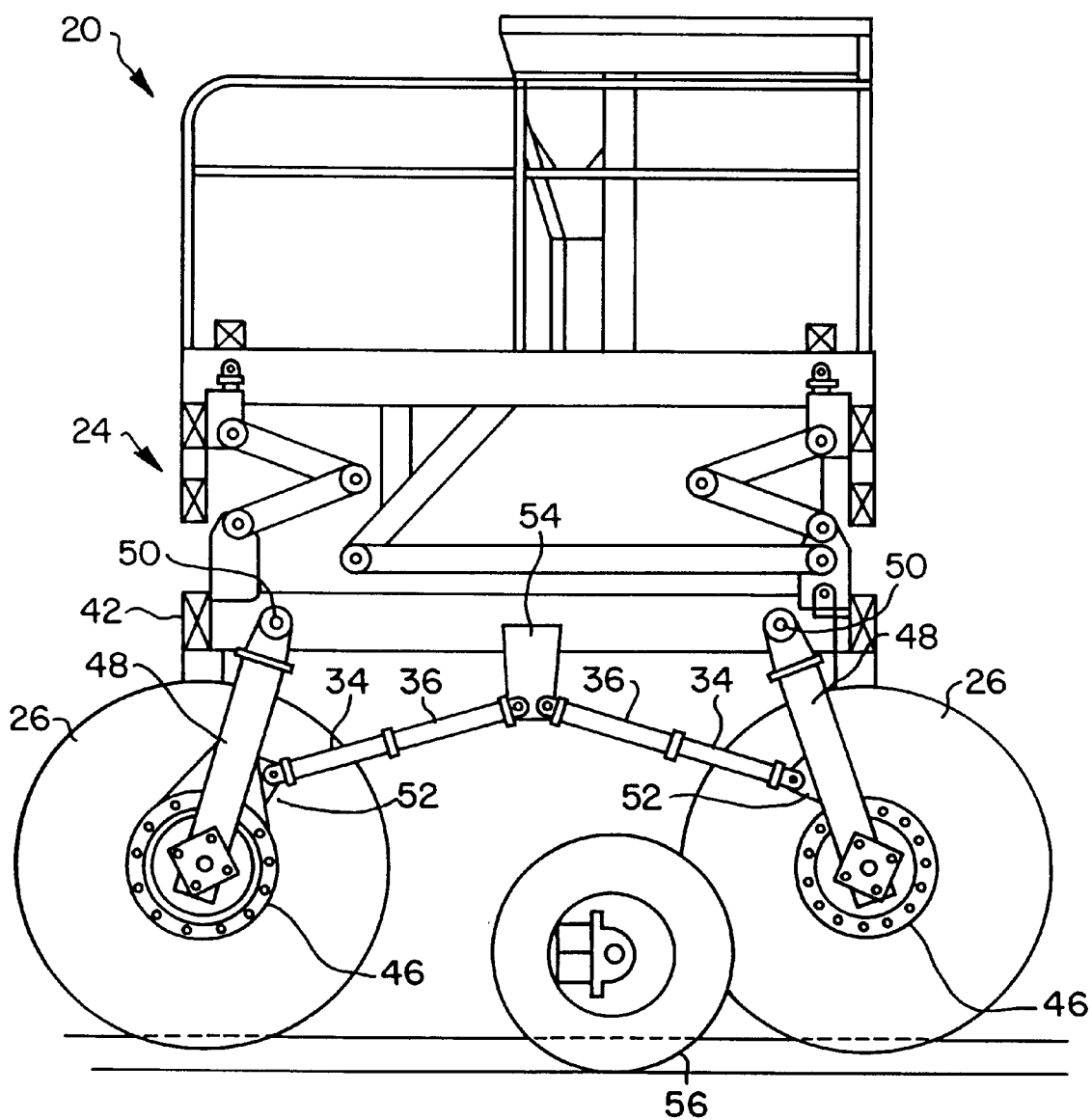
FIG. 5 shows a side view of the pivotable wheel mounting system of a second embodiment with the wheel mounting device in an extended position.

In FIGS. 4 and 5, the second embodiment of the pivotable wheel mounting system 24 is shown. The wheel mounting device of the second embodiment includes a beam structure 48 which has a first end connected to the adjustable suspension structure 42 and a second end which rotatably supports the wheel 26. The beam structure 48 is preferably a straight beam structure but other beam structures which provide support such as curved or structures having angled bends or the like can be employed. The beam structure 48 is preferably rigid, but other beam structures which include shock mounting devices such as springs or piston cylinder arrangements or the like can be employed.

A first end of the beam structure 48 is connected to the adjustable suspension structure 42 preferably by a pin assembly which provides a rotational axis of the beam structure 48. The connection of beam structure 48 to the adjustable suspension structure 42 is not limited to the pin assembly 50 and can include other structures such as bearings or the like. The second end of beam structure 48 is connected to a powering device 46 which drives the wheel 26. The beam structure 48 is connected to piston 34 preferably by an eye bracket 52 but other attachment devices such as pin assemblies including bolts or rivets or the like may be employed.

In this embodiment, the cylinder 36 is connected to a mounting block 54 located in a central portion of the adjustable suspension structure 42.

In this embodiment, when the wheel mounting device, beam structure 48, is in the extended position, the wheels 26 extend substantially beyond the adjustable suspension structure to provide stable support for both the compost treating vehicle 20 and the rotatable drum assembly 56. It is further noted that since each wheel 26 has a separate power device 46, the compost treating vehicle will have four wheel drive capability to enable the compost treating vehicle to drive over rough terrains such as fields having windrows of compost.

Figure 6:
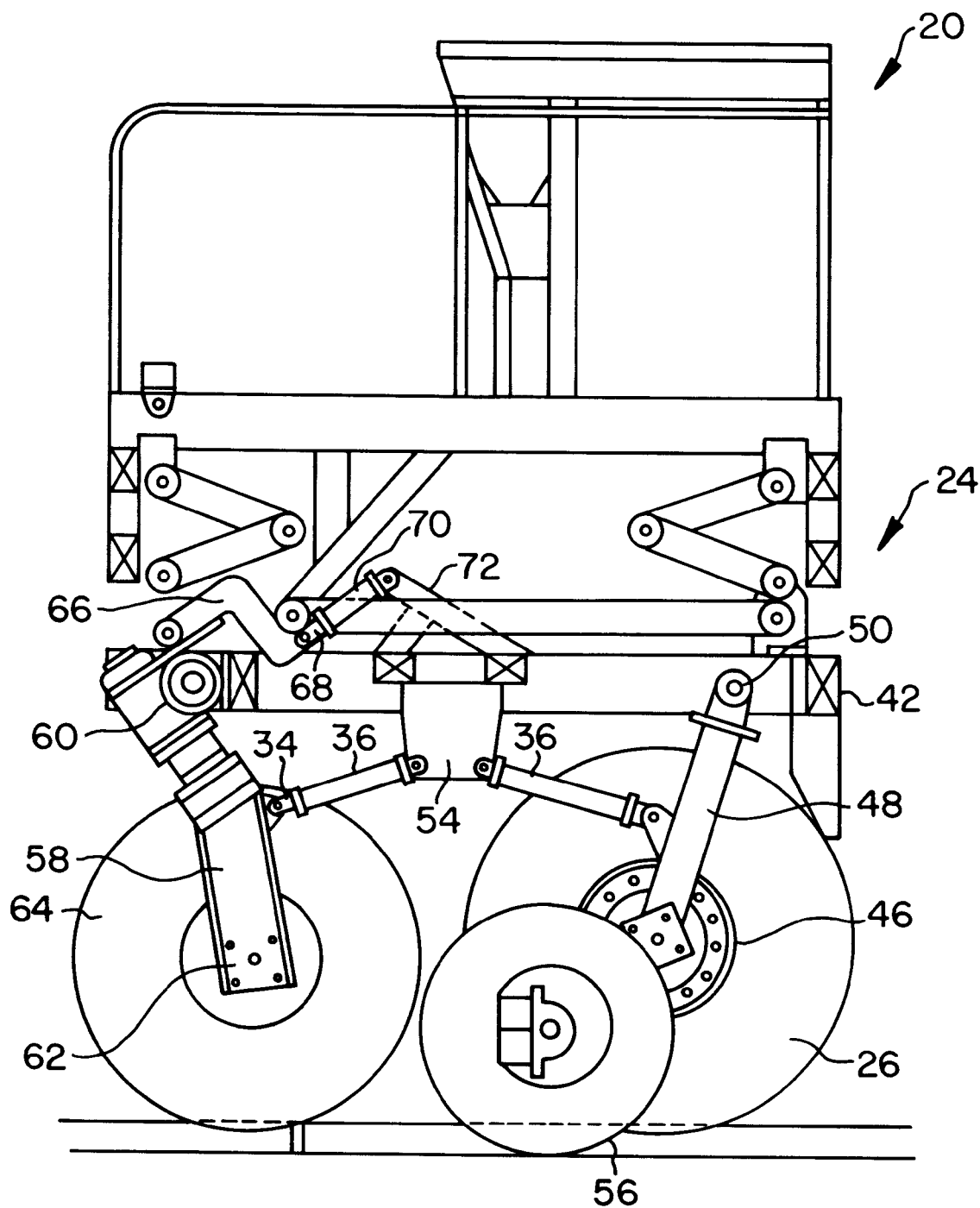
FIG. 6 shows a side view of a third embodiment of the pivotable wheel mounting system with the wheel mounting device in a retracted position.
Figure 7:
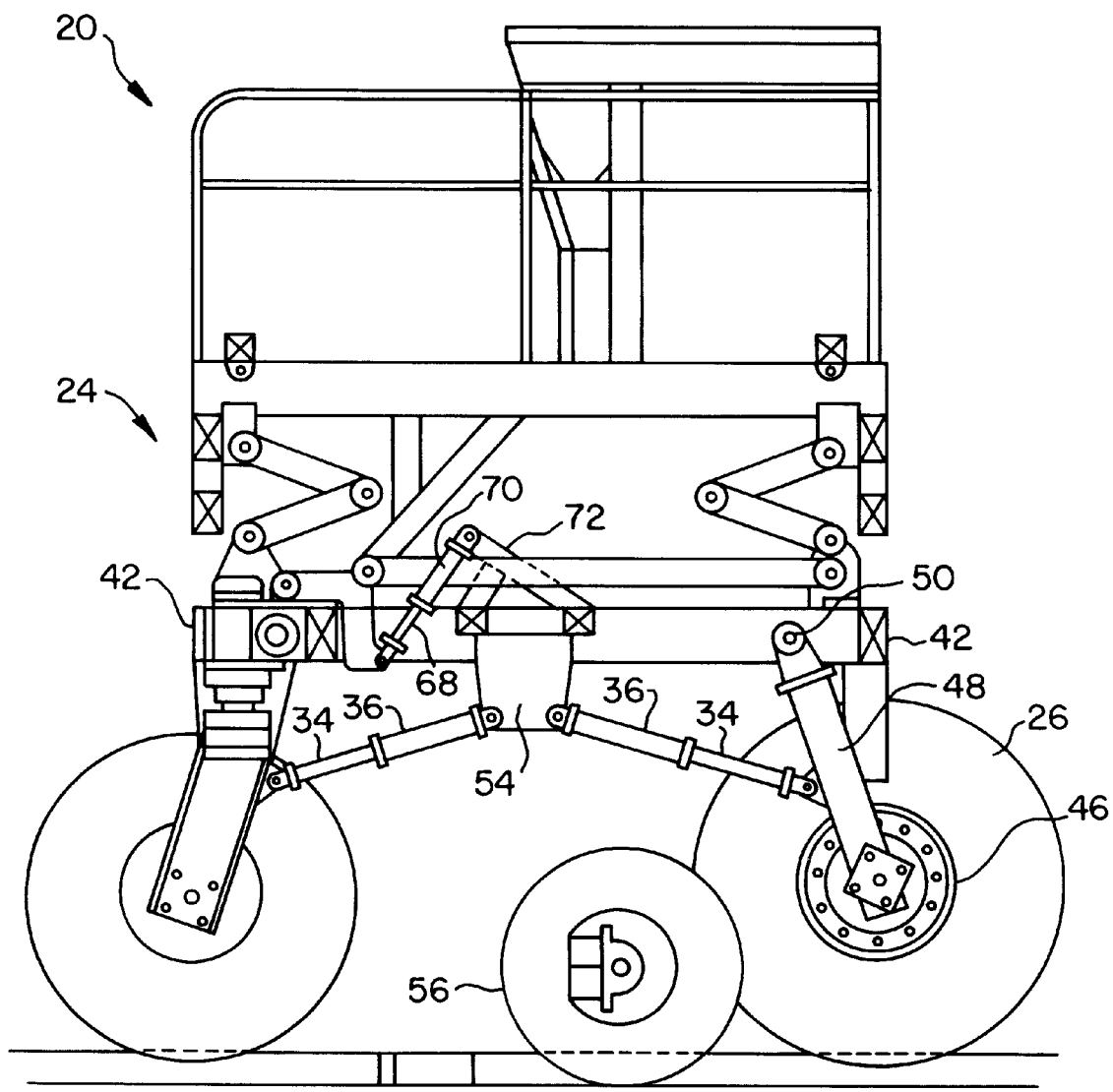
FIG. 7 shows the pivotable wheel mounting system of the third embodiment with the wheel mounting device in an extended position.

In FIGS. 6 and 7, a third embodiment of the pivotable wheel mounting system is shown. Similar to the pivotable wheel mounting system of the second embodiment, the third embodiment includes a wheel mounting device having a beam structure 48 with a power device 46. The pivotable wheel mounting system 24 of the third embodiment further includes a bent beam structure 58 which has a pin assembly 60 at a first end and a second end which supports an axle 62 for a smaller sized wheel 64 which has a diameter that is smaller than the diameter of the powered driven wheel 26. The connection between the bent arm 58 and the adjustable suspension structure 42 is not limited to the pin assembly 60 and therefore can include other rotatable mounting devices such as bearings or the like.

The supporting assembly of the bent arm structure for the wheel 64 is not limited to the axle 62 but can include other devices such as bearings or pin assemblies or other like structures. The wheel mounting device of the third embodiment further includes an arm structure 66 having a first end connected to the first end of the bent beam structure 58 and a second end of the arm structure 66 being connected to the adjustable suspension structure 42. The arm structure 66 is preferably "L"-shaped to provide a mechanical advantage when rotating the bent beam structure 58. However, the arm structure shape is not limited to the "L"-shape and can include other shapes such as "Z"-shapes or curve shapes or angled shapes or other similarly shaped structures providing a mechanical advantage.

The arm structure 66 is connected to the adjustable suspension structure by a second piston 68 and second cylinder 70 arrangement. The second piston 68 and second cylinder 70 are preferably a hydraulic cylinder arrangement but other arrangements can be employed such as pneumatic piston and cylinder arrangements or rotatable screw extending devices or other like structures. The second piston 68 and cylinder 70 are supported by a small cantilever beam assembly 72 which is preferably welded to the adjustable suspension structure 42, but other attachment devices such as bolts, rivets, and plate assemblies may be employed. The connection between the second cylinder 70 and the adjustable suspension structure 42 is not limited to the small cantilever beam assembly 72 but can include a mounting bracket assembly which incorporates welds or bolts or other like structures may be employed.

In this embodiment, when all of the piston and cylinder arrangements are in the retracted positions, the wheels 26 and 64 are substantially enclosed by the adjustable suspension structure 42. Conversely, when all of the piston and cylinder arrangements are in extended positions, the wheels 64 and 26 extend substantially beyond the adjustable suspension structure 42. It is noted that in this embodiment, the small diameter wheel 64 does not have a separate power device and therefore the vehicle 20 preferably has only two wheel drive capability. This two wheel drive capability is preferable for environments -where the terrain in which the compost treating vehicle is driven over is smooth and provides little driving resistance.

Figure 8:
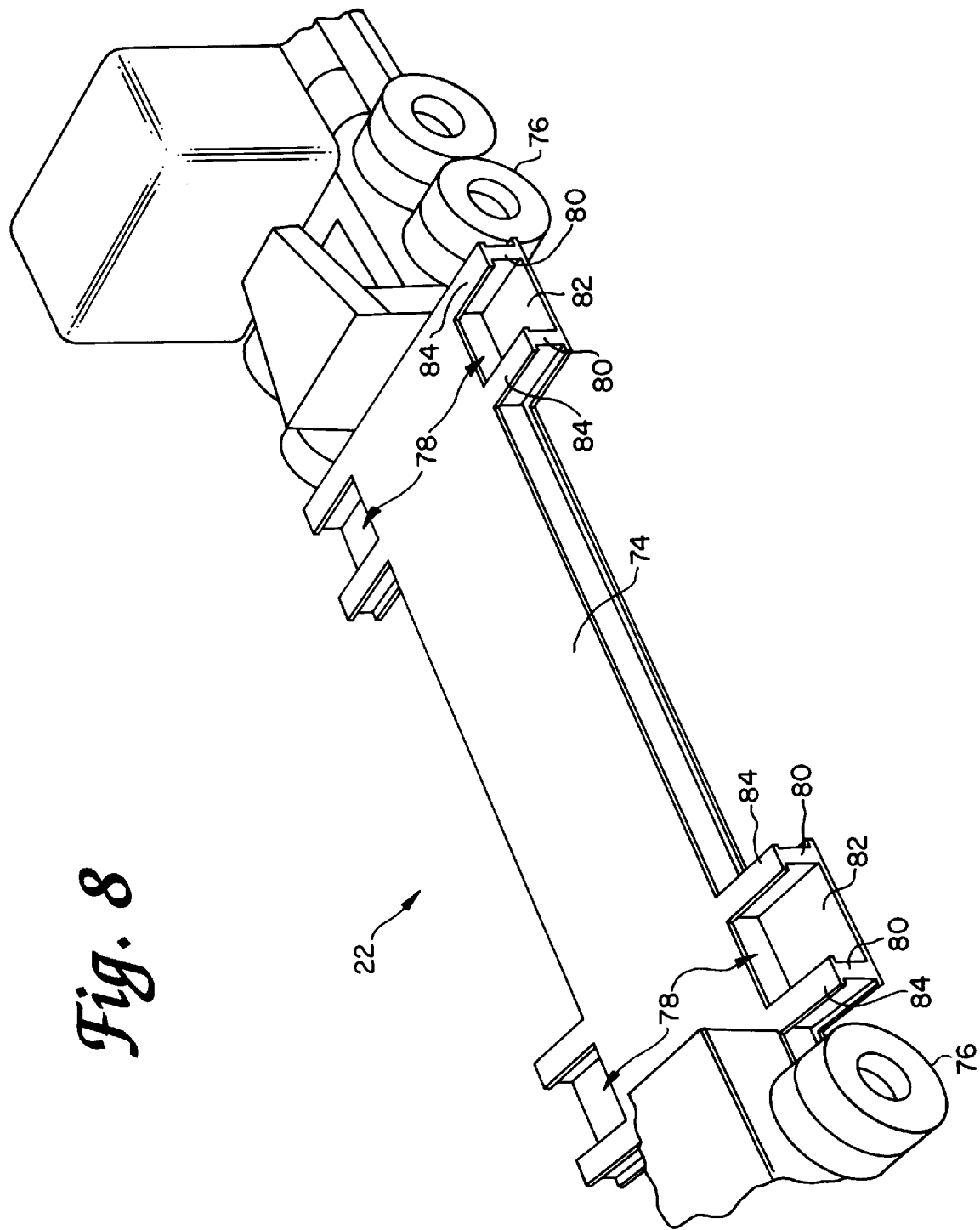
FIG. 8 shows a partial, perspective view of a vehicle carrier according to the present invention.

The vehicle carrier 22 is shown in FIG. 8. The vehicle carrier 22 includes a vehicle frame platform 74. The vehicle frame platform 74 is preferably substantially planar but other types of platforms which have grooves or ridges or uneven surfaces or the like may be employed. The vehicle carrier further includes a plurality of wheels 76. The vehicle carrier 22 further includes a plurality of vehicle wheel wells 78 which can store wheels with or without endless track units. The vehicle frame platform 74 is preferably substantially "I"-shaped but can have other shapes depending on the number of wheel wells needed to support the wheels of a vehicle. Each of the vehicle wheel wells 78 has at least two side walls 80 opposing each other and being substantially perpendicular to a respective vehicle wheel platform 82 in which the side walls 80 are mounted upon. The shape of the vehicle wheel platform 82 and the side walls 80 are preferably rectangular in shape but other shapes such as square, curved or round may be employed depending on the shape of the wheels of the vehicle which are being supported. Each of the side walls 80 have a top surface 84 which is substantially flush with the vehicle frame platform 74.

Figure 9:
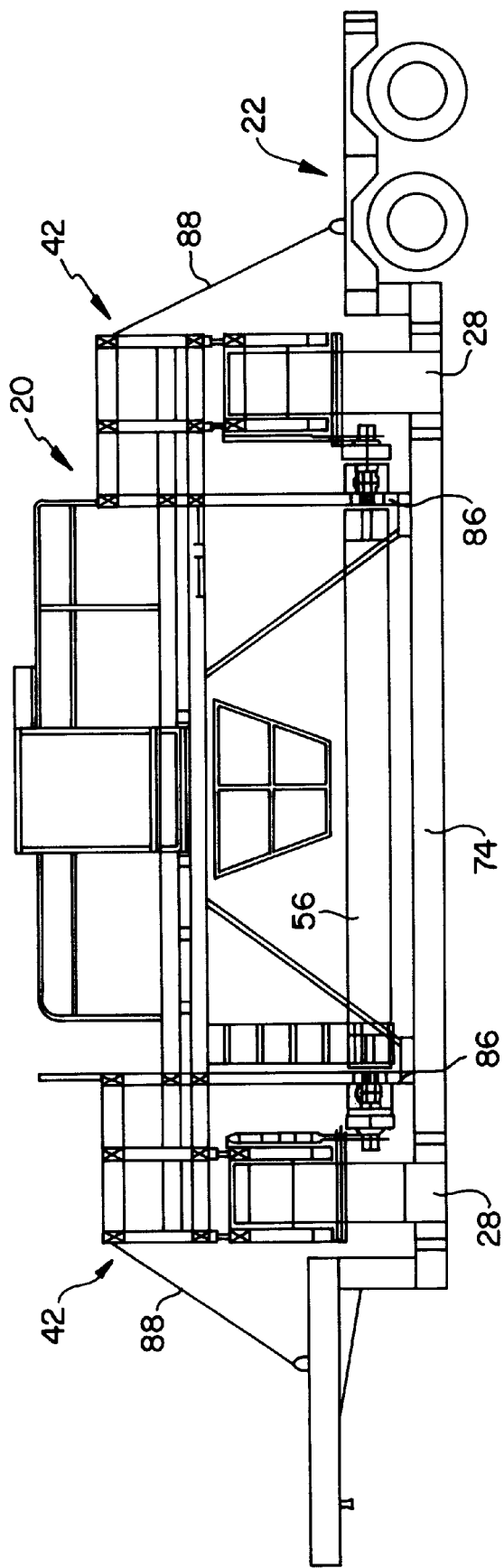
FIG. 9 shows a side view of the vehicle being fully loaded on the vehicle carrier of FIG. 8 of the present invention.

FIG. 9 shows the compost vehicle 20 fully mounted on the vehicle carrier 22 where the endless tracks 28 are in a retracted position and the vehicle frame 86 is supported by the substantially planar platform 74. Attached to the compost treating vehicle 20 is a tie device 88 which connects the vehicle 20 to the vehicle carrier 22. The tie device 88 is preferably a chain, but other tie devices such as ropes, rubber straps, or a combination of chains and rubber devices or the like may be employed. The tie device 88 is preferably attached to the compost treating vehicle 20 by a hook ring assembly, but other assemblies such as ratcheting devices or pulleys or the like may be employed. The tie device 88 is connected to the vehicle carrier 22 preferably by a hook assembly oriented in a predetermined orientation but other devices such as pin assemblies, eyelet brackets, or ring assemblies or the like may be employed. The hook assembly causes the tie device to become substantially taut when the compost treating vehicle 20 is loaded on the vehicle carrier 22. Conversely, due to its predetermined orientation, the hook assembly permits the tie device 88 to become automatically detached from the vehicle carrier 22 during the unloading of the compost treating vehicle 20.

The pivotable wheel mounting system of each embodiment provides a method of loading and unloading a vehicle 20 onto a vehicle carrier 22. The method includes steps for providing a vehicle 20 with a frame 86 and a wheel mounting device and the wheel mounting device rotatably supporting at least one wheel 26 or 64. The method further comprises the step of moving the vehicle 20 onto the vehicle carrier 22 by lowering the frame 86 onto the carrier 22 through an adjustable suspension structure 42. The method further comprises the step of pivoting the wheel mounting device after the step of lowering the adjustable suspension structure 42 in order to enclose the wheel 20 or 26 within the adjustable suspension structure for compact storage. The method includes the step of raising the wheel 20 or 64 out of engagement with the vehicle carrier wheel well during the step of lowering the frame onto the substantially planar platform 74. The method also includes a step where prior to moving the vehicle 20 onto the vehicle carrier 22, a tie device 88 is attached between the vehicle carrier 22 and the vehicle 20 and the tie device 88 is tightened by moving the vehicle 20 onto the vehicle 22 whereby the tie device becomes substantially taught when the vehicle 20 is fully loaded on the carrier 22 as shown in FIG. 9. During the unloading of the vehicle, the tie device 88 is automatically released from the vehicle carrier 22 due to the predetermined direction of the hook assembly which connects the tie device 88 to the vehicle carrier 22. Therefore, the tie device 88 provides "hands-free" unloading of the vehicle 20 from the vehicle carrier 22.

With this pivotable wheel mounting system 24, the wheel mounting devices of a vehicle are pivoted in a retracted position so that the vehicle conforms to a vehicle carrier volume that is in accordance with local transport laws and regulations. In other words, the vehicle will be with a certain envelope during transport which is in conformance with the legal limits. The pivotable wheel mounting system extends the wheels of a vehicle to positions for substantially stable support in a driving (non-transport) mode. The pivotable wheel mounting system 24 provides a method for loading and unloading a vehicle onto a vehicle carrier whereby the vehicle is stably secured on the vehicle carrier.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

I claim:

1. A pivotable wheel mounting system for a vehicle comprising:
    a wheel;
    a wheel mounting device for supporting said wheel;
    means for pivoting said wheel mounting device in an extended position and a retracted position; and
    a vehicle frame with an adjustable suspension structure for pivotally supporting said wheel mounting device, said adjustable suspension structure raises and lowers said wheel mounting device and said wheel, said means for pivoting said wheel mounting device being connected to said adjustable suspension structure, whereby when said wheel mounting device is in the extended position, said wheel is in a use position whereby said vehicle is drivable, and when said wheel mounting device is in the retracted position, said adjustable suspension structure substantially encloses said wheel for compact storage.

2. The pivotable wheel mounting system for a vehicle of claim 1, further comprising:
    a plurality of wheels; and
    an endless track, said track being mounted on said wheels, whereby when said wheel mounting device is in said extended position, said track and one of said wheels extends beyond said adjustable suspension structure, and when said wheel mounting device is in said retracted position, said plurality of wheels are substantially enclosed by said adjustable suspension structure.

3. The pivotable wheel mounting system for a vehicle of claim 2, wherein said means for pivoting said wheel mounting device rotates said wheels substantially ninety degrees from said extended position to said retracted position.

4. The pivotable wheel mounting system for a vehicle of claim 1, wherein said wheel mounting device comprises an arm structure having a first end and a second end, said first end being connected to said adjustable suspension structure and providing a rotation axis for said wheel mounting device, said second end of said arm structure being connected to said means for pivoting said wheel mounting device, whereby said means for pivoting said wheel mounting device rotates said wheel mounting device around said rotation axis.

5. The pivotable wheel mounting system for a vehicle of claim 4, wherein said wheel mounting device further comprises a beam structure supporting a plurality of wheels, said beam structure being connected to said means for pivoting said wheel mounting device and said second end of said arm, said beam structure being substantially perpendicular to said means for pivoting said wheel mounting device in said extended position, and said beam structure being substantially parallel to said means for pivoting said wheel mounting device in the retracted position.

6. The pivotable wheel mounting system for a vehicle of claim 2, further comprising at least four endless track units for supporting and moving said vehicle, said endless track units each having separate power devices for driving said units.

7. The pivotable wheel mounting system for a vehicle of claim 1, wherein said vehicle is a compost treating vehicle for agitating or disintegrating compost windrows.

8. The pivotable wheel mounting system for a vehicle of claim 1, wherein said wheel mounting device further comprises a beam structure having a first end and a second end, said first end being connected to said adjustable suspension structure to provide a rotation axis of said wheel mounting device, said second end rotatably supporting said wheel.

9. The pivotable wheel mounting system for a vehicle of claim 8, wherein said wheel mounting device further comprises an attachment device for connecting a side of said beam structure to said means for pivoting said wheel mounting device, whereby when said wheel mounting device is in said extended position, said wheel extends beyond said adjustable suspension structure, and when said wheel mounting device is in said retracted position, said wheel is substantially enclosed by said adjustable suspension structure.

10. The pivotable wheel mounting system for a vehicle of claim 8, further comprising at least four wheels for supporting said vehicle, said wheels each having separate power devices.

11. The pivotable wheel mounting system for a vehicle of claim 1, wherein said wheel mounting device further comprises a bent beam structure having a first end and a second end, said first end being connected to said adjustable suspension structure at a rotation axis of said wheel mounting device, said second end rotatably supporting said wheel.

12. The pivotable wheel mounting system for a vehicle of claim 11, further comprising an arm structure having a first end and a second end, said first end of said arm structure being connected to said first end of said bent beam structure, and a second end of said arm structure being connected to said adjustable suspension structure.

13. The pivotable wheel mounting system for a vehicle of claim 12, wherein said means for pivoting said wheel mounting device includes a first cylinder having a first piston and a second cylinder having a second piston, said second piston being connected to said second end of said arm structure, said second cylinder being connected to said adjustable suspension structure, whereby when said first and second pistons are in extended positions, said wheel extends beyond said adjustable suspension structure, and when said first and second pistons are in retracted positions, said wheel is substantially enclosed by said adjustable suspension structure.

14. The pivotable wheel mounting system for a vehicle of claim 11, wherein said wheel is a first wheel and said bent beam structure is a first beam structure, said means for pivoting said wheel mounting device includes a first cylinder having a first piston for moving said first beam structure, said pivotable wheel mounting system for a vehicle further comprising:
    a second beam structure having a first end and a second end;
    a second wheel, said means for pivoting includes a second cylinder having a second piston for moving said second beam structure, said first end of said second beam structure being connected to said adjustable suspension structure to provide a rotation axis of said second beam structure, said second end rotatably supporting said second wheel, and said second wheel driven by a power device.

15. The pivotable wheel mounting system for a vehicle of claim 14, wherein said second wheel has a diameter larger than a diameter of said first wheel.

16. The pivotable wheel mounting system for a vehicle of claim 14, furthering comprising at least four wheels wherein for moving and supporting said vehicle, two of said wheels having separate power devices for driving said two wheels.

17. A method of loading and unloading a vehicle onto a vehicle carrier, said method comprising the steps of:

providing a vehicle with a frame and a wheel mounting device, the wheel mounting device rotatably supporting at least one wheel;

moving said vehicle onto said vehicle carrier; lowering said frame onto said carrier by an adjustable suspension structure; and pivoting said wheel mounting device after the step of lowering to substantially enclose the at least one wheel within the adjustable suspension structure for compact storage.

18. The method of loading and unloading a vehicle onto a vehicle carrier of claim 17, wherein the at least one wheel is in engagement with the vehicle carrier when the vehicle is moved onto the vehicle carrier and wherein the method further comprises the step of raising said at least one wheel out of engagement with the vehicle carrier during the step of lowering said frame.

19. The method of loading and unloading a vehicle onto a vehicle carrier of claim 18, further comprising the steps of:

prior to moving said vehicle onto said vehicle carrier, attaching a tie device between said vehicle carrier and said vehicle; and tightening the tie device by moving said vehicle onto said vehicle carrier, whereby said tie device becomes substantially taught when the vehicle is fully loaded on the carrier.

20. The method of loading and unloading a vehicle onto a vehicle carrier of claim 17, wherein the step of pivoting said wheel mounting device further comprises the step of retracting a piston into a cylinder, said piston being connected to said wheel mounting device, said cylinder being connected to said adjustable suspension structure, said piston and cylinder forming said means for pivoting said wheel mounting device.

21. The method of loading and unloading a vehicle onto a vehicle carrier of claim 20, wherein the step of pivoting said wheel mounting device further comprises the step of rotating an arm structure having a first end and a second end, said first end being connected to said adjustable suspension structure and providing a rotation axis for said wheel mounting device, said second end of said arm structure being connected to said piston, whereby said piston rotates said wheel mounting device around said rotation axis.

22. The method of loading and unloading a vehicle onto a vehicle carrier of claim 20, wherein the step of pivoting the wheel mounting device further comprises the step of rotating a beam structure having a first end and a second end by said piston, said first end being connected to said adjustable suspension structure to provide a rotation axis of said wheel mounting device, said second end rotatably supporting said wheel.

23. The method of loading and unloading a vehicle onto a vehicle carrier of claim 20, wherein said wheels are enclosed by an endless track, the step of pivoting said wheel mounting device further comprises the step of rotating a beam structure supporting said wheels and being connected to said piston so that said beam is substantially parallel to said piston.

24. The method of loading and unloading a vehicle onto a vehicle carrier of claim 22, wherein the step of pivoting the wheel mounting device comprises the step of rotating a bent beam structure by the retraction of at least two pistons in at least two hydraulic cylinders.

* * * * *